Patented Nov. 17, 1931

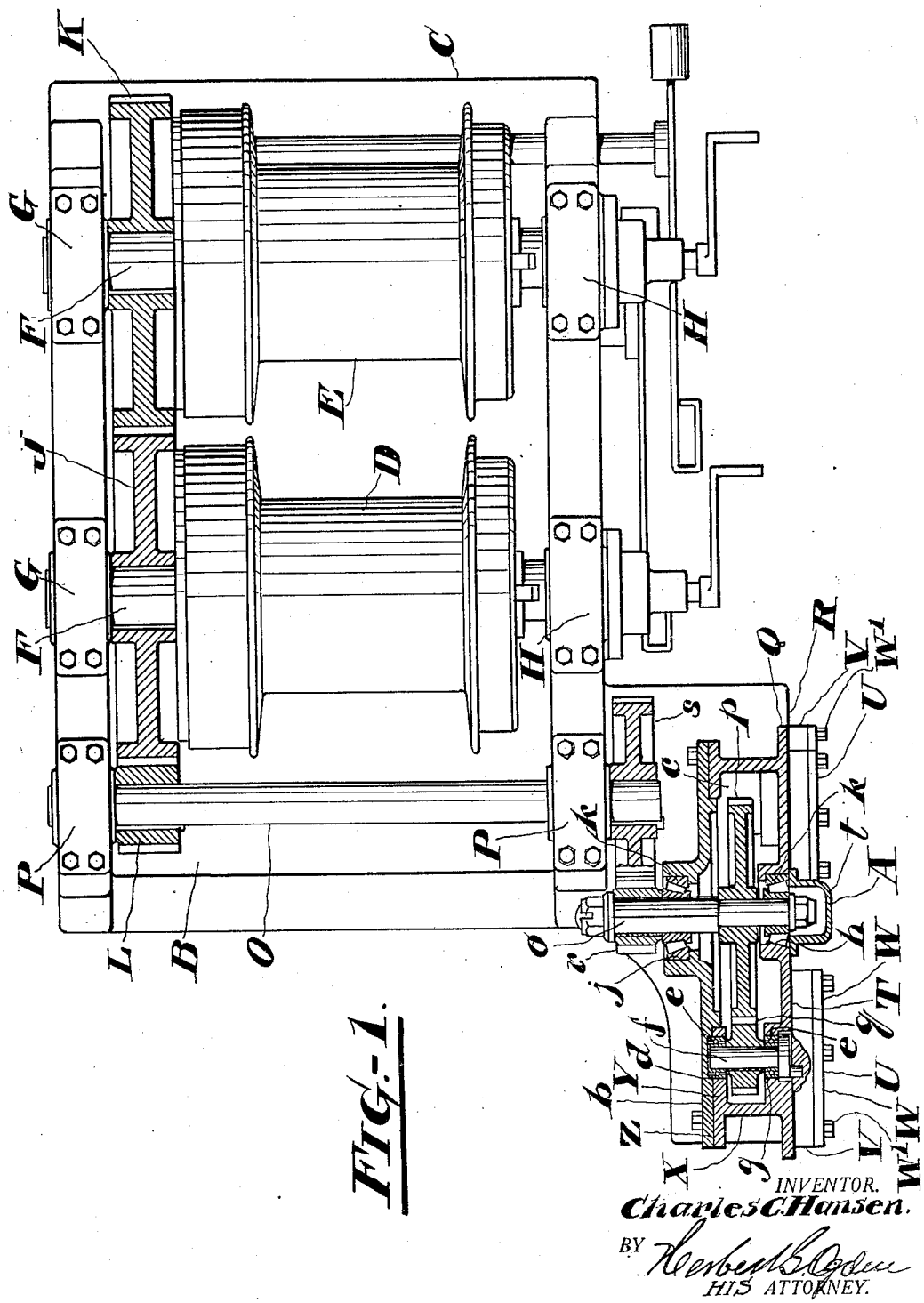

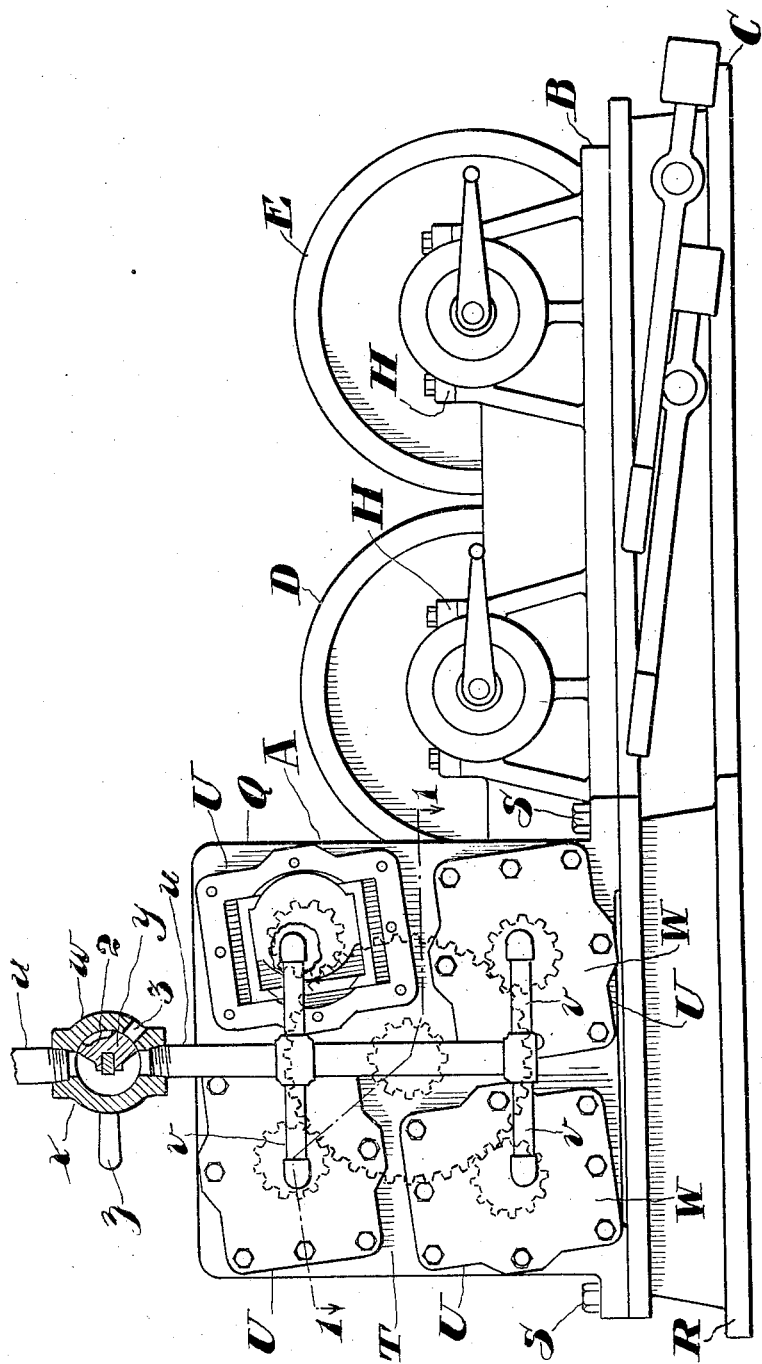

1,832,630

UNITED STATES PATENT OFFICE

CHARLES C. HANSEN, OF EASTON, PENNSYLVANIA, ASSIGNOR TO INGERSOLL-RAND COMPANY, OF JERSEY CITY, NEW JERSEY, A CORPORATION OF NEW JERSEY

MOTOR DRIVE

Application filed August 2, 1927. Serial No. 210,186.

This invention relates to motor drives, but more particularly to a motor drive in which a plurality of engines or motors are mounted on the same plate and are suitably connected to a common drive shaft through which the power of the motors may be transmitted to an element intended to be actuated.

The objects of the invention are to form a compact motor drive having a wide range of application and to enable one or more of the motors to be removed from the assembly and utilized for other purposes whenever the combined power of all the motors is considerably in excess of that required by the element to which the motor drive is attached.

Other objects will be in part obvious and in part pointed out hereinafter, and to all of these ends the invention consists of the combination of elements and arrangement of parts having the general mode of operation substantially as hereinafter described and claimed and illustrated in the accompanying drawings, in which Figure 1 is a plan view in section of the motor drive taken through Figure 2 on the line 1—1 looking in the direction indicated by the arrows and showing one mode of application of the invention, and Figure 2 is a side elevation of the motor drive and a hoist to which it is attached.

Referring more particularly to the drawings, the motor drive is generally designated by A and is shown for illustrative purposes attached to a hoist B. The hoist B in this instance comprises a base plate C on which are mounted in tandem drums D and E adapted to rotate freely about their supporting drum shafts F.

In the construction shown the drum shafts F are supported at their ends by bearings G and H and between the drums D and E and the bearings G are disposed intermeshing gear wheels J and K which may be keyed or otherwise suitably secured to the drum shafts F. Meshing with the gear wheel J is a pinion L keyed in this instance to a counter shaft O journalled in bearings P which may be suitably secured to the base plate C.

In accordance with the present invention, a plate Q is mounted vertically on an extension R of the base plate C to which it is secured by means of bolts S. The outer side of the plate Q is in the form of a smooth flat surface T and on this surface T are parallelly mounted in spaced radial arrangement a plurality of motors U, in this instance of the flat piston or Dake type. The casings of the motors U in this instance comprise cylinders V and outer heads W of substantially the same outline as the cylinders V and the motors U are secured to the plate Q by bolts W'.

It will be observed that the plate Q does not only form a mounting for the several motors U but also acts as a common head for the corresponding sides or ends of each of the motors mounted thereon, it being understood that the usual inner heads with which the motors U are usually equipped have been removed from the motor assemblies in order to enable said motors to be mounted on the plate Q in the manner hereinbefore described.

In the present instance, the plate Q is provided with a lateral wall or walls X carrying at its inner end a flange Y substantially paralleling the plate Q.

To the outside surface Z of the flange Y is bolted a cover plate $b$ which forms a closure for a gear case $c$ formed by the plate Q and the walls X to prevent the entrance of dust and other foreign matter into the gear case $c$.

In the construction shown the flange Y and the cover plate $b$ are of such proportions and design as to enable the formation therein of apertures $d$ in which are disposed antifriction bearings $e$ for the inner ends of crank shafts $f$ operatively connected to the motors U. The apertures $d$ are thus aligned with similar apertures $g$ in the plate Q for similar anti-friction bearings $e$ which support the opposite or inner ends of the crank shafts $f$.

Suitably located in the plate Q and the cover plate $b$ are apertures $h$ and $j$ respectively for the reception of anti-friction bearings $k$ provided for a drive shaft $o$ which extends through the gear case $c$. A gear wheel $p$ keyed on the drive shaft $o$ is so positioned that it meshes with pinions $q$ keyed to each of the crank shafts $f$. The inner end of the drive shaft $o$ in this instance overhangs the cover plate $b$ and on the overhanging portion of said drive shaft is keyed a driving pinion $r$ which meshes with a gear wheel $s$ carried by the counter shaft O. Preferably a cap $t$ is placed over the outer end of the drive shaft to seat against the surface T of the plate Q for preventing the admission of dust into the gear case $c$.

As will be readily observed, the motors illustrated are intended to be actuated by pressure fluid such as compressed air, and such compressed air in this instance may be conveyed from a suitable source of supply (not shown) through a pipe $u$ having branches $v$ leading to the several motors for supplying pressure fluid in equal amounts to each motor.

In addition to other means which may be interposed in the pipe $u$ for controlling the flow of pressure fluid to the motor, a valve assembly $w$ is interposed in the pipe $u$. The valve assembly in this instance comprises a casing $x$ to which the pipe $u$ is threaded and a valve $y$ in the casing is connected operatively to a lever $z$ whereby the valve $y$ may be manipulated. The valve $y$ may be of a well known type which in one position permits a flow of pressure fluid through the casing $x$ from one pipe section $u$ to the other and has in one side a recess 2 of suitable proportions to connect the pipe section $u$ between the casing $x$ and the motors with an exhaust port 3 in the casing $x$ whenever the motors U are inoperative.

In practice, whenever the requirements of the hoist are such that the entire power out-put of the maximum number of motors which the plate Q will accommodate are necessary for the proper actuation of the hoist B, all of the motors U, four in this instance, may be secured to the plate Q. However, in the event that there may be a period in which the duties of the hoist will be comparatively light, one or more of the motors U may be removed from the plate Q and after being assembled in the usual manner, that is, provided with their usual head as hereinbefore stated, said motors may be utilized for other purposes. This is a highly advantageous feature, particularly in certain lines of work where there are usually a number of these motors on hand and periods during which the motors may lie idle. By means of the present invention, these motors may at all times be in service, either for light work in which case the motors may serve individually, or for heavy work for which purpose the motors may be combined for driving a hoist or other machine, and this without necessitating the additional expense of equipping the hoist with a propelling element of exceptionally great power and for which there may be need only at widely spaced intervals.

I claim:

1. A motor drive, comprising in combination, a plurality of independently disposed and complete motors, crank shafts on the motors, said motors including a plate forming a head for each of the motors, side walls integral with the plate, a flange integral with the side walls, and apertures in the plate and the flange forming bearings for the crank shafts of the motors in such manner that the motors will operate conjointly and each be individually removed from or added to the plate without disturbing the operativeness of those assembled on the plate.

2. A motor drive, comprising in combination, a plurality of independently disposed and complete motors, crank shafts on the motors, pinions on the crank shafts, said motors including a plate forming a head for each of the motors, integral side walls on the plate, a flange on the side walls and integral therewith paralleling the plate, apertures in the plate and the flange forming bearings for the crank shafts, a drive shaft supported rotatably at one end by the plate, and a gear wheel on the drive shaft meshing with the pinions for transmitting power from the motors to an element intended to be actuated in such manner that the motors will operate conjointly and each be individually removed from or added to the plate without disturbing the operativeness of those assembled on the plate.

3. A motor drive, comprising in combination, a plurality of independently disposed and complete motors, crank shafts on the motors, pinions carried by the crank shafts, said motors including a plate forming a head for each of the motors, integral side walls on the plate, a flange integral with the side walls, said flange and said plate rotatably supporting the crank shafts, a cover plate secured to the flange, a drive shaft supported rotatably by the plate and the cover plate, and a gear wheel on the drive shaft meshing with the pinions for transmitting power from the motors to an element intended to be actuated in such manner that the motors will operate conjointly and each be individually removed from or added to the plate without disturbing the operativeness of those assembled on the plate.

In testimony whereof I have signed this specification.

CHARLES C. HANSEN.